(12) United States Patent
Shurkewitsch et al.

(10) Patent No.: US 11,111,842 B2
(45) Date of Patent: Sep. 7, 2021

(54) METHOD FOR CHARGE PRESSURE CONTROL OF AN INTERNAL COMBUSTION ENGINE

(71) Applicant: VOLKSWAGEN AKTIENGESELLSCHAFT, Wolfsburg (DE)

(72) Inventors: Andre Shurkewitsch, Calberlah (DE); Elmar Millich, Berlin (DE); Lars Petersen, Meinersen (DE); Robert Wetten, Berlin (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 16/586,518

(22) Filed: Sep. 27, 2019

(65) Prior Publication Data
US 2020/0109659 A1 Apr. 9, 2020

(30) Foreign Application Priority Data

Oct. 8, 2018 (DE) ...................... 10 2018 217 117.3

(51) Int. Cl.
*F02B 37/22* (2006.01)
*F02B 37/18* (2006.01) *F02D 13/02* (2006.01)
(Continued)

(52) U.S. Cl.
CPC ............ *F02B 37/22* (2013.01); *F02B 37/183* (2013.01); *F02D 13/0261* (2013.01);
(Continued)

(58) Field of Classification Search
CPC ........ F02B 37/22; F02B 37/18; F02B 37/183; F02B 37/24; F02D 13/0261; F02D 23/00;
(Continued)

(56) References Cited

U.S. PATENT DOCUMENTS 8,397,499 B2 * 3/2013 Doering .............. F02D 41/0007
123/562
9,470,142 B2 10/2016 Takagi
2011/0155108 A1 6/2011 Russ
(Continued)

FOREIGN PATENT DOCUMENTS

| CN | 102200061 A | 9/2011 |
| DE | 19851457 A1 | 2/2000 |
| DE | 10 2005 010 792 A1 | 9/2006 |
| DE | 10 2008 063935 A1 | 6/2010 |

(Continued)

OTHER PUBLICATIONS

Office Action for Chinese Patent Application No. 201910880957.2, dated May 24, 2021.

*Primary Examiner* — Jesse S Bogue
*Assistant Examiner* — Loren C Edwards
(74) *Attorney, Agent, or Firm* — Pearl Cohen Zedek Latzer Baratz LLP

(57) ABSTRACT

A method for charge pressure control of an internal combustion engine that is an integral part of a drive train, wherein the drive train comprises at least the internal combustion engine, an intake line, an exhaust gas line, and an exhaust gas turbocharger. The internal combustion engine has at least one intake valve that fluidically connects the intake line to a combustion chamber of the internal combustion engine, and at least one exhaust valve that fluidically connects the combustion chamber to a first section of the exhaust gas line. The exhaust gas line has a first section between the combustion chamber and the exhaust gas turbocharger, and a second section downstream from the exhaust gas turbocharger. The exhaust gas turbocharger and/or a bypass that bypasses the exhaust gas turbocharger are/is adjustable. In the method, an opening point in time of the at least one intake valve and a closing point in time of the at least one exhaust valve are taken into account.

15 Claims, 3 Drawing Sheets

(51) Int. Cl.
  *F02D 41/00* (2006.01)
  *F02D 41/14* (2006.01)
(52) U.S. Cl.
  CPC ..... *F02D 41/0007* (2013.01); *F02D 41/1445* (2013.01); *F02D 41/1446* (2013.01); *F02D 41/1448* (2013.01); *F02D 41/1486* (2013.01); *F02D 2200/0406* (2013.01); *F02D 2200/10* (2013.01); *F02D 2200/101* (2013.01)
(58) Field of Classification Search
  CPC ............ F02D 41/0007; F02D 41/1406; F02D 2041/1433; F02D 41/1445; F02D 41/1446; F02D 41/1448; F02D 41/1486
  See application file for complete search history.

(56) References Cited

U.S. PATENT DOCUMENTS

| | | | |
|---|---|---|---|
| 2013/0213035 A1* | 8/2013 | Kamiyama | ........... F02B 75/041 60/602 |
| 2014/0174073 A1 | 6/2014 | Karnik et al. | |
| 2014/0363278 A1 | 12/2014 | Piper et al. | |

FOREIGN PATENT DOCUMENTS

| | | |
|---|---|---|
| DE | 10 2013 223900 A1 | 5/2015 |
| DE | 10 2015 202135 A1 | 8/2016 |
| DE | 10 2015 203225 A1 | 8/2016 |
| DE | 10 2015 215566 A1 | 2/2017 |
| DE | 10 2015 216261 A | 3/2017 |
| JP | 2004 176568 A | 6/2004 |
| JP | 4587923 B2 | 11/2010 |
| WO | WO 2008/140393 A1 | 11/2008 |

\* cited by examiner

1

METHOD FOR CHARGE PRESSURE CONTROL OF AN INTERNAL COMBUSTION ENGINE

FIELD OF THE INVENTION

The invention relates to a method for charge pressure control of an internal combustion engine.

The internal combustion engine is in particular an integral part of a drive train, the drive train comprising at least the internal combustion engine, an intake line, an exhaust gas line, and an exhaust gas turbocharger. The exhaust gas turbocharger is in particular a variable turbine geometry (VTG) exhaust gas turbocharger.

BACKGROUND OF THE INVENTION

Methods for controlling a VTG exhaust gas turbocharger are known from the documents DE 10 2008 063 935 A1, DE 10 2013 223 900 A1, and DE 10 2015 216 261 A1, via which an optimal position of the exhaust gas turbocharger is to be determined as a function of an operating point of an internal combustion engine. The aim is for the optimal position of the exhaust gas turbocharger to allow the maximum possible turbine power of the exhaust gas turbocharger to be provided.

It has been shown that, in particular in recent combustion engines, at certain operating points it is possible to achieve only slower and/or inharmonious charge pressure and torque buildup. In addition, it is possible that the internal combustion engine itself may stall due to an excessively high setting of the exhaust gas back pressure (when the exhaust gas turbocharger has only a small flow cross section), so that the requested torque cannot be achieved.

For this reason, a maximum duty cycle of the exhaust gas turbocharger is limited (i.e., the flow cross section is not reduced to a minimum), so that in any case, reaching an excessively high exhaust gas back pressure (in a section of the exhaust gas line between the internal combustion engine and the exhaust gas turbocharger) is prevented.

However, as the result of limiting the duty cycle, the charge pressure and torque buildup take place more slowly, i.e., not with the optimal speed.

The object of the present invention is to at least partially solve the problems described with regard to the prior art. In particular, the aim is to propose a method for charge pressure control of an internal combustion engine, via which charge pressure and/or torque buildup can take place as quickly as possible.

SUMMARY OF THE INVENTION

These objects are achieved by a method having the features according to the independent claims. Advantageous refinements are the subject matter of the dependent claims. The features individually set forth in the patent claims may be combined with one another in a technologically meaningful manner, and may be supplemented by the explanatory material from the description and/or details from the figures, which indicate further embodiment variants of the invention.

A method for charge pressure control of an internal combustion engine is proposed, wherein the internal combustion engine is an integral part of a drive train. The drive train comprises at least the internal combustion engine, an intake line, an exhaust gas line, and an exhaust gas turbocharger. The internal combustion engine has at least one intake valve that fluidically connects the intake line to (at least) one combustion chamber of the internal combustion engine, and at least one exhaust valve that fluidically connects the combustion chamber to a first section of the exhaust gas line. The exhaust gas line has a first section between the combustion chamber and the exhaust gas turbocharger, and a second section downstream from the exhaust gas turbocharger. An overall cross-sectional area between the first section and the second section through which the exhaust gas may flow is adjustable. This may take place via a bypass (wastegate), with a regulatable flow, that connects the first section to the second section and completely bypasses the exhaust gas turbocharger, and/or via an adjustable exhaust gas turbocharger which, the same as the bypass, is adjustable between a first position having a smallest flow cross section for an exhaust gas, and a second position having a largest flow cross section for the exhaust gas (for example, continuously or in specific steps). In conjunction with the bypass, in particular a nonadjustable exhaust gas turbocharger may be used, so that the overall cross-sectional area through which flow may pass is then regulated via the bypass.

The method comprises at least the following steps:
a) Detecting a load requirement for the drive train;
b) Determining a position of the exhaust gas turbocharger and/or of the bypass for providing turbine power of the exhaust gas turbocharger.

In step b), an opening point in time of the at least one intake valve and a closing point in time of the at least one exhaust valve are taken into account.

Recent internal combustion engines are being charged at increasingly higher levels, at the same time with reduced piston displacement (so-called "downsizing"). During dynamic changing of operating points of the internal combustion engine, a buildup of torque is a function in particular of the interplay between control of the throttle valve, the camshaft, and the charge pressure. In present gasoline engines from individual manufacturers, it is becoming increasingly common to develop internal combustion engines with VTG exhaust gas turbochargers which, among other things, are operated with the so-called Miller combustion process for pollution control (nitrogen oxides emissions, for example). In this combustion process, an intake valve of a combustion chamber is already closed, for example during the intake stroke, so that the cylinder charge is reduced. This reduces the temperature and the pressure at the end of the compression stroke. Due to the exhaust gas turbocharger, additional mixture can be introduced into the combustion chamber, so that losses and lower power compared to conventional internal combustion engines may be compensated for. In addition, overlaps occur during the valve control; i.e., the intake valve and the exhaust valve of a combustion chamber are at least partially open at the same time, at least temporarily, so that the intake line is fluidically connected to the exhaust gas line via the combustion chamber.

For combustion processes that operate with this type, or some other type, of actuation of the intake valves and exhaust valves, a fresh air charge remaining in the cylinder due to the high degree of valve overlap (i.e., time overlap of the opening point in time of an intake valve and a closing point in time of an exhaust valve of a combustion chamber; i.e., during the overlap the intake line is fluidically connected to the exhaust gas line (the first section) via the combustion chamber) is a function of a third pressure in the intake line and of a first pressure in the first section of the exhaust gas line. In addition, the possible variance of the pressures greatly increases due to the use of VTG exhaust gas turbochargers. In particular, the exhaust gas turbocharger influences the third pressure in the intake manifold as well as the first pressure in the first section.

Furthermore, in recent internal combustion engines, camshaft adjusters are used in a targeted manner for reducing fuel consumption and for regulating the fresh air charge to the combustion chamber. The sensitivity of a cylinder charge (i.e., the filling of the combustion chamber) is greatly influenced by the third pressure in the intake line and by the first pressure in the first section of the exhaust gas line due to the different camshaft positions (and the associated changes in the actuation of the intake valves and exhaust valves).

It has been found that present charge pressure control functions cannot, or cannot sufficiently, take into account the differing sensitivities of the cylinder charge, so that it is possible to achieve only slower and/or inharmonious charge pressure and torque buildup. In particular, the camshaft positions, i.e., the opening point in time of an intake valve and the closing point in time of an exhaust valve (and the resulting time overlap in which both valves are in an open position, and the intake line is fluidically connected to the first section of the exhaust gas line via the combustion chamber), thus far have not been taken into consideration.

In the present case, within the scope of the method for charge pressure control it is proposed in particular to take into account a camshaft position, i.e., the position of at least one intake valve and of at least one exhaust valve of a (shared) combustion chamber.

In particular, the internal combustion engine is a gasoline engine, or alternatively, a diesel engine. At least fresh air may be supplied to the combustion chamber via the intake line. The intake line is fluidically connectable to or separable from the combustion chamber via the at least one intake valve. The exhaust gas line is fluidically connectable to or separable from the combustion chamber via the at least one exhaust valve.

The exhaust gas turbocharger is adjustable in particular between a first position having a smallest flow cross section for an exhaust gas, and a second position having a largest flow cross section for the exhaust gas (for example, continuously or in specific steps) over multiple (intermediate) positions. In the first position, a large pressure ratio between the first pressure (in the exhaust gas line upstream from the exhaust gas turbocharger) and the second pressure (in the exhaust gas line downstream from the exhaust gas turbocharger) may be achieved, while in the second position only a smaller pressure ratio may be achieved.

Alternatively, the exhaust gas turbocharger does not have an adjustable design. In this case, a controllable bypass is provided, through which the exhaust gas may be guided from the first section into the second section while bypassing the exhaust gas turbocharger. The turbine power of the exhaust gas turbocharger may be regulated as a result of the change in the cross-sectional area of the bypass through which flow may pass. The bypass, the same as the adjustable exhaust gas turbocharger, is adjustable in particular between a first position having a smallest flow cross section for an exhaust gas, and a second position having a largest flow cross section for the exhaust gas (for example, continuously or in specific steps) over multiple (intermediate) positions. In the first position, a large pressure ratio between the first pressure (in the exhaust gas line upstream from the exhaust gas turbocharger) and the second pressure (in the exhaust gas line downstream from the exhaust gas turbocharger) may be achieved, while in the second position only a smaller pressure ratio may be achieved.

According to another embodiment, a bypass is provided and the exhaust gas turbocharger is adjustable in the described manner.

In each of the described design types, an overall cross-sectional area (of the bypass and/or the exhaust gas turbocharger) through which flow may pass is adjusted.

In particular, during operation of the internal combustion engine, a time overlap of the opening point in time and of the closing point in time occurs, so that the first section is fluidically connected, at least temporarily, to the intake line via the combustion chamber.

In particular, the time overlap may also be described by an angular range between the positions of a crankshaft or of at least one camshaft, in which an actuation of the intake valve and an actuation of the exhaust valve take place.

Taking into account the actuation of the intake valves and exhaust valves allows the cylinder charge, i.e., the cylinder air mass, to be determined more accurately.

Thus, the air mass flow or the exhaust gas mass flow may be determined in particular via the speed of the internal combustion engine.

The turbine power of the exhaust gas turbocharger is in particular proportional to a product of the exhaust gas mass flow and a function of a pressure ratio over the exhaust gas turbocharger (i.e., the ratio of the first pressure to the second pressure).

In particular, in step a) it is detected that a load requirement for the drive train is present or is planned. This may, for example, be measured by means of at least one sensor or determined by means of a computational model. A (change in the) load requirement may initiate the triggering of step b) of the method.

In particular, at least one (preferably at least two or even all) of the following parameters is/are additionally taken into account in step b): a cylinder air mass, a speed of the internal combustion engine, an air mass flow (in the intake line), an exhaust gas mass flow (in the exhaust gas line), a first pressure in the first section of the exhaust gas line, a second pressure in the second section of the exhaust gas line, a third pressure in the intake line, and a temperature of the exhaust gas.

In particular, the position of the exhaust gas turbocharger ascertained in step b) is iteratively determined.

Within the scope of the iterative method, a profile of the turbine power at least as a function of a first pressure in the first section is determined.

In particular, based on the profile, a specific first pressure is iteratively determined for which the turbine power is at a maximum.

In particular, starting from the first position (smallest flow cross section, i.e., maximum generatable pressure difference between the first pressure and the second pressure), the profile is iteratively determined in a stepwise manner toward the second position.

An increment of the iteration is preferably selected as a function of an available computing power of a control unit.

The increment is preferably varied during the iterative method. In particular, the increment is larger when the available computing power of a control unit is lower, and conversely, the increment is smaller when the available computing power of a control unit is greater.

Based on the first pressure, determined, for example, within the scope of the iteration, and for which the turbine power is at a maximum, a position of the exhaust gas turbocharger, i.e., a setting of the overall cross-sectional area of the bypass and the exhaust gas turbocharger through which flow may pass, for which the previously determined maximum turbine power is achievable as a function of the parameters then present may be subsequently determined.

In particular, based on the iteratively determined value of the first pressure, no further iteration is carried out, in order to determine the position of the exhaust gas turbocharger, i.e., a setting of the overall cross-sectional area of the bypass and the exhaust gas turbocharger through which flow may pass, for which the previously determined maximum turbine power is achievable as a function of the parameters then present.

In particular, the method is carried out only when a sudden change in load is present. In particular, the method is carried out only when the sudden change in load is positive, i.e., when a requested torque is higher than a torque that is present.

Preferably only the portion of the method for which the parameters under consideration have changed is recomputed.

In particular, (only or at least) two different situations are taken into account in the method. The particular situation may, for example, be predicted or ascertained by an iterative determination of a profile of the turbine power over the first pressure in the first section of the exhaust gas line.

In the first situation, the turbine power increases continuously, starting from the second position and going toward the first position (of the exhaust gas turbocharger or the bypass), so that the position of the exhaust gas turbocharger or of the bypass may be transferred into the first position.

In the second situation, (only) a maximum of the profile of the turbine power is present over the first pressure. In this case, the maximum of the turbine power is (iteratively) determined, for example starting from the first position, so that the first pressure that is present at the maximum may be used for determining the position to be set for the adjustable exhaust gas turbocharger.

The method, in particular the (iterative) determination of the value of the first pressure, for which a maximum of the turbine power is present takes place in particular solely by computation in a control unit. Thus, in particular none of the parameters are applied to the drive train. In particular, the position of the exhaust gas turbocharger that is then determined is set as quickly as possible, but only after the computation has ended, so that a charge pressure and/or torque buildup may take place as quickly as possible via the maximum turbine power thus achievable.

Moreover, a motor vehicle having a drive train and an internal combustion engine is proposed, wherein the internal combustion engine is an integral part of the drive train. The drive train comprises at least the internal combustion engine, an intake line, an exhaust gas line, and an exhaust gas turbocharger. The internal combustion engine has at least one intake valve that fluidically connects the intake line to (at least) one combustion chamber of the internal combustion engine, and at least one exhaust valve that fluidically connects the combustion chamber to a first section of the exhaust gas line. The exhaust gas line has a first section between the combustion chamber and the exhaust gas turbocharger, and has a second section downstream from the exhaust gas turbocharger. An overall cross-sectional area between the first section and the second section through which the exhaust gas may flow is adjustable. This may take place via a bypass (wastegate), with a regulatable flow, that connects the first section to the second section and bypasses the exhaust gas turbocharger, and/or via an adjustable exhaust gas turbocharger which, the same as the bypass, is adjustable between a first position having a smallest flow cross section for an exhaust gas, and a second position having a largest flow cross section for the exhaust gas (for example, continuously or in specific steps). In addition, a control unit is provided that is suitably designed and configured for carrying out the described method, and/or that carries out or can carry out the method.

In particular, the control unit utilizes at least one model that is stored in the control unit. The at least one model is, for example, a first model via which a cylinder air charge is determinable as a function of parameters, and/or a second model via which an exhaust gas mass flow is determinable as a function of parameters, and/or a third model via which the turbine power of the exhaust gas turbocharger is determinable as a function of parameters.

In particular, the control unit utilizes two of the stated models, one of the models being provided for controlling the internal combustion engine (for example, for controlling the intake valves, exhaust valves, ignition times, mixture formation), and the other of the models being provided for controlling the exhaust gas turbocharger (for example, for changing the turbine geometry or the bypass, i.e., for adjusting the position).

Furthermore, the method may also be carried out by a computer or with a processor of a control unit.

Accordingly, a system for data processing is also proposed which includes a processor that is adapted/configured in such a way that it carries out the method or a portion of the steps of the proposed method.

A computer-readable memory medium may be provided that includes commands which, when executed by a computer/processor, prompt the computer/processor to carry out the method or at least a portion of the steps of the proposed method.

The statements concerning the method are applicable in particular to the motor vehicle, the system, the memory medium, or the computer-implemented method, and vice versa.

As a precaution, it is noted that the ordinal numbers used herein ("first," "second," "third," . . . ) are used primarily (only) to distinguish between multiple similar objects, variables, or processes; i.e., in particular no dependency and/or sequence of these objects, variables, or processes relative to one another are/is necessarily specified. If a dependency and/or sequence is necessary, this is explicitly indicated herein, or is readily apparent to those skilled in the study of the embodiment specifically described.

BRIEF DESCRIPTION OF THE DRAWINGS

The invention and the technical context are explained in greater detail below with reference to the appended figures. It is pointed out that the invention is not to be construed as being limited by the illustrated exemplary embodiments. In particular, unless explicitly stated otherwise, it is also possible to extract partial aspects of the information shown in the figures and combine them with other components and findings from the present description. In particular, it is noted that the figures and in particular the illustrated proportions are only schematic. In the figures.

DETAILED DESCRIPTION OF THE INVENTION

Figure 1:
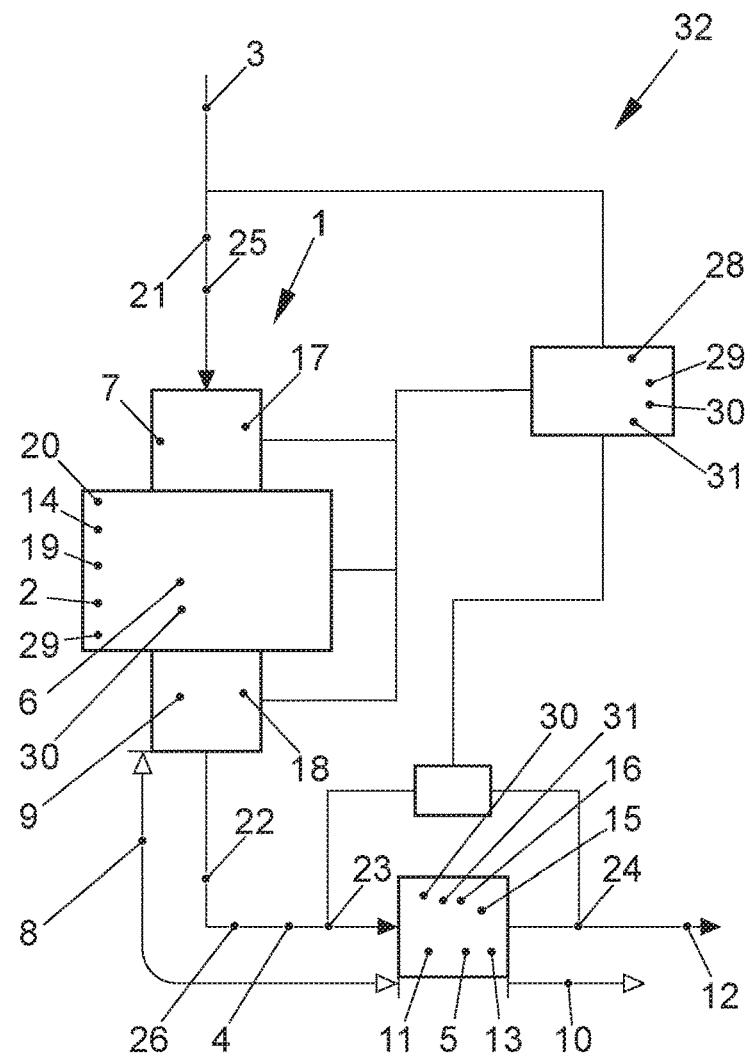
FIG. 1: shows a motor vehicle 2 having a drive train 1.

FIG. 1 shows a motor vehicle 32 having a drive train 2. The drive train 2 comprises an internal combustion engine 1, an intake line 3, an exhaust gas line 4, and an exhaust gas turbocharger 5. The internal combustion engine 1 has an intake valve 7 that fluidically connects the intake line 3 to a combustion chamber 6 of the internal combustion engine 1, and an exhaust valve 9 that fluidically connects the combustion chamber 6 to a first section 8 of the exhaust gas line 4. The exhaust gas line 4 has a first section 8 between the combustion chamber 6 and the exhaust gas turbocharger 5, and a second section 10 downstream from the exhaust gas turbocharger 5. The exhaust gas turbocharger 5 is adjustable between a first position 11 having a smallest flow cross section for an exhaust gas 12, and a second position 13 having a largest flow cross section for the exhaust gas 12 (for example, continuously or in specific steps). In addition, a control unit 28 is provided that is suitably designed for carrying out the described method and/or that carries out or can carry out the method.

The control unit 28 utilizes models 29, 30, 31 that are stored in the control unit 28. The models 29, 30, 31 comprise a first model 29 via which a cylinder air charge (i.e., a cylinder air mass 19) is determinable as a function of parameters, a second model 30 via which an exhaust gas mass flow 22 is determinable as a function of parameters, and a third model 31 via which the turbine power 16 of the exhaust gas turbocharger 5 is determinable as a function of parameters.

The first model 29 is provided for controlling the internal combustion engine 1 (for example, for controlling the intake valve 7, the exhaust valve 9, the ignition times, the mixture formation), and the third model 31 is provided for controlling the exhaust gas turbocharger 5 (for example, for changing the turbine geometry, i.e., for adjusting the position 15).

Within the scope of step a), the presence of a load requirement 14 for the drive train 2 is recognized; i.e., in step a) a load requirement 14 is present that is to be implemented by the control unit. A position 15 of the exhaust gas turbocharger 5 for providing the greatest possible, i.e., maximum, turbine power 16 of the exhaust gas turbocharger 5 is determined in step b). An opening point in time 17 of the intake valve 7 and a closing point in time 18 of the exhaust valve 9 are taken into account in step b).

The following parameters are additionally taken into account in the method: a cylinder air mass 19, a speed 20 of the internal combustion engine 1, an air mass flow 21 (in the intake line 3), an exhaust gas mass flow 22 (in the exhaust gas line 4), a first pressure 23 in the first section 8 of the exhaust gas line 4, a second pressure 24 in the second section 10 of the exhaust gas line 4, a third pressure 25 in the intake line 3, and a temperature 26 of the exhaust gas 12.

Figure 2:
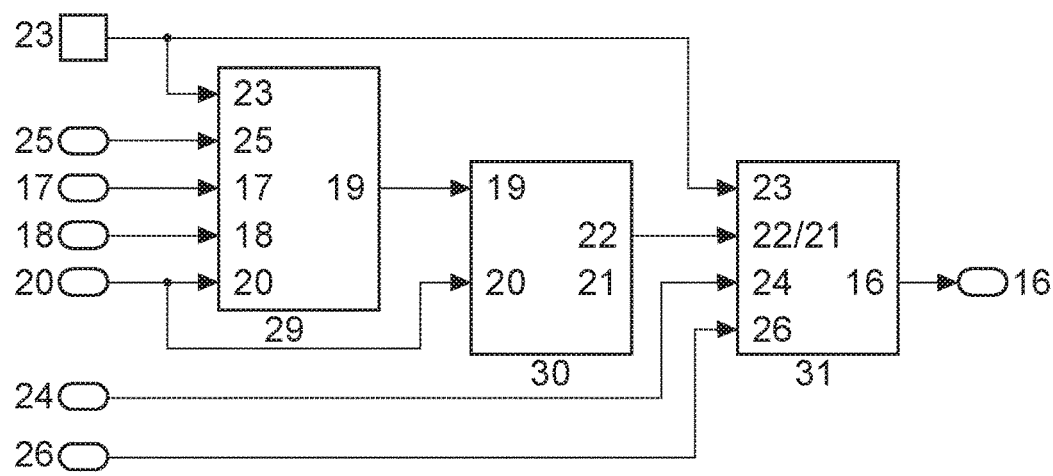
FIG. 2: shows a first flow chart.

FIG. 2 shows a first flow chart that illustrates the relationships of the individual parameters utilized by the present method. The first pressure 23 (exhaust gas back pressure in the first section 8), the third pressure 25 in the intake manifold 3, the opening point in time 17 of the intake valve 7, the closing point in time 18 of the exhaust valve 9, the speed 20 of the internal combustion engine 1, the second pressure 24 in the second section 10, and the temperature 26 of the exhaust gas 12 are used as input variables.

Different values of the first pressure 23 are used as an input variable within the scope of an iteration.

The parameters comprising the first pressure 23, third pressure 25, opening point in time 17 of the intake valve 7, closing point in time 18 of the exhaust valve 9, and speed 20 of the internal combustion engine 1 are used as input variables for the first model 29 for determining the resulting cylinder air mass 19.

The cylinder air mass 19 determined within the scope of the particular iteration, together with the speed 20, is used as an input variable for the second model 30 for determining the resulting exhaust gas mass flow 22 (or the air mass flow 21 corresponding thereto).

The exhaust gas mass flow 22 determined within the scope of the particular iteration, together with the value of the first pressure 23, the second pressure 24, and the temperature 26 of the exhaust gas 12 utilized for the particular iteration, is used as an input variable for the third model 31 for determining the resulting turbine power 16.

Figure 3:
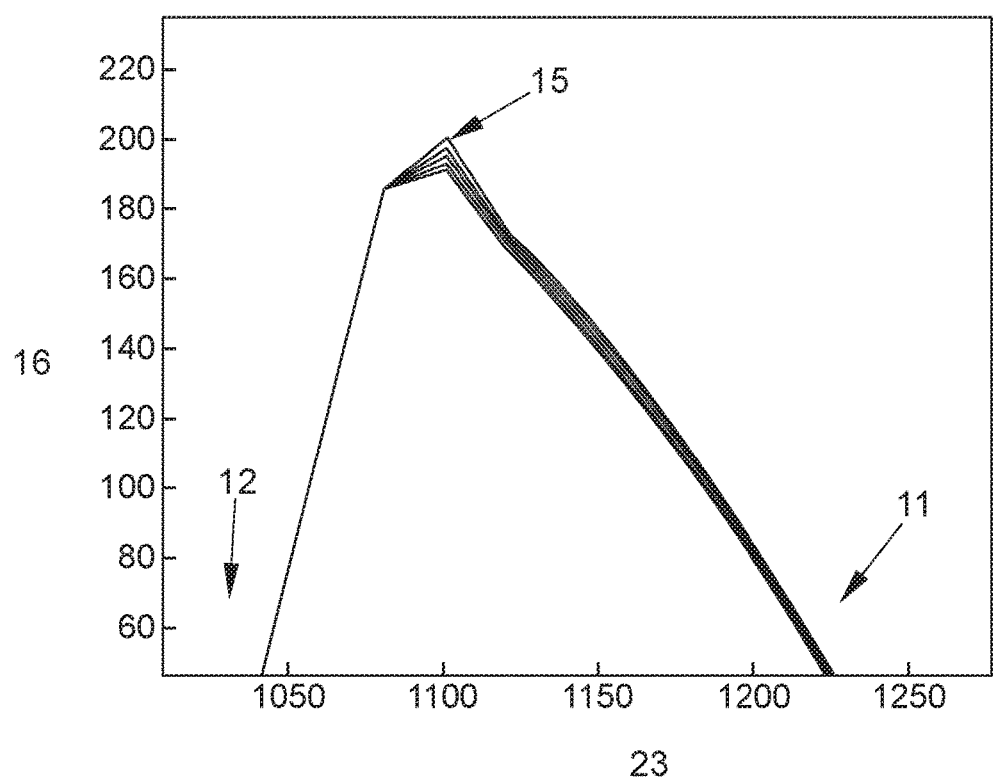
FIG. 3: shows a first diagram.

As a result of the iteration, a profile 27 of the turbine power 16 over the various values of the first pressure 23 may be (computationally) determined (see FIG. 3).

The iteration is carried out in particular solely by computation; i.e., none of the parameters used within the scope of the iteration are actually set in the drive train 2.

FIG. 3 shows a first diagram with the first pressure 23 plotted on the horizontal axis and the turbine power plotted on the vertical axis. FIG. 3 shows the profile 27 of the turbine power 16, determined within the scope of the method or within the scope of an iteration, over the various values of the first pressure 23. A maximum in the profile 27 is present, so that it is apparent that the described second situation is present.

The iteration explained with reference to FIG. 2 takes place starting from a first position 11 of the exhaust gas turbocharger 5 (smallest flow cross section, i.e., maximum generatable pressure difference between the first pressure 23 and the second pressure 24), and is iteratively determined in a stepwise manner toward the second position 12.

Figure 4:
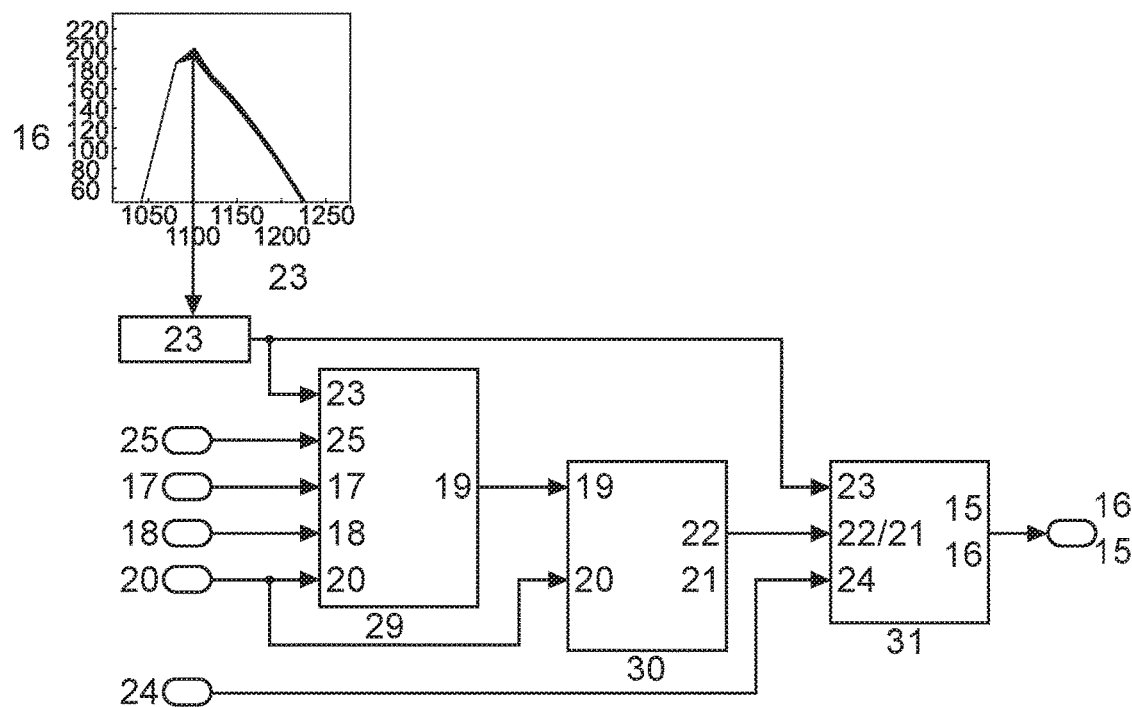
FIG. 4: shows a second flow chart together with a second diagram.

FIG. 4 shows a second flow chart together with a second diagram. For the second flow chart, the value of the first pressure 23 for which a maximum turbine power 16 is present from the first flow chart according to FIG. 1 is used as an input variable.

Thus, the first pressure 23 (the exhaust gas back pressure in the first section 8 for which a maximum of the turbine power 16 in the present operating point has been determined), the third pressure 25 in the intake manifold 3, the opening point in time 17 of the intake valve 7, the closing point in time 18 of the exhaust valve 9, the speed 20 of the internal combustion engine 1, and the second pressure 24 in the second section 10 are used as input variables.

The parameters comprising the first pressure 23 (with the value for which the maximum of the turbine power 16 in the present operating point has been determined), the third pressure 25, the opening point in time 17 of the intake valve 7, the closing point in time 18 of the exhaust valve 9, and the speed 20 of the internal combustion engine 1 are used as input variables for the first model 29 for determining the resulting cylinder air mass 19.

The cylinder air mass 19 thus determined, together with the speed 20, is used as an input variable for the second model 30 for determining the resulting exhaust gas mass flow 22 (or the air mass flow 21 corresponding thereto).

The exhaust gas mass flow 22 thus determined, together with the value of the first pressure 23 and the second pressure 24 utilized here, is used as an input variable for the third model 31 for determining the position 15 of the exhaust gas turbocharger 5 necessary for generating the maximum turbine power 16.

Figure 5:
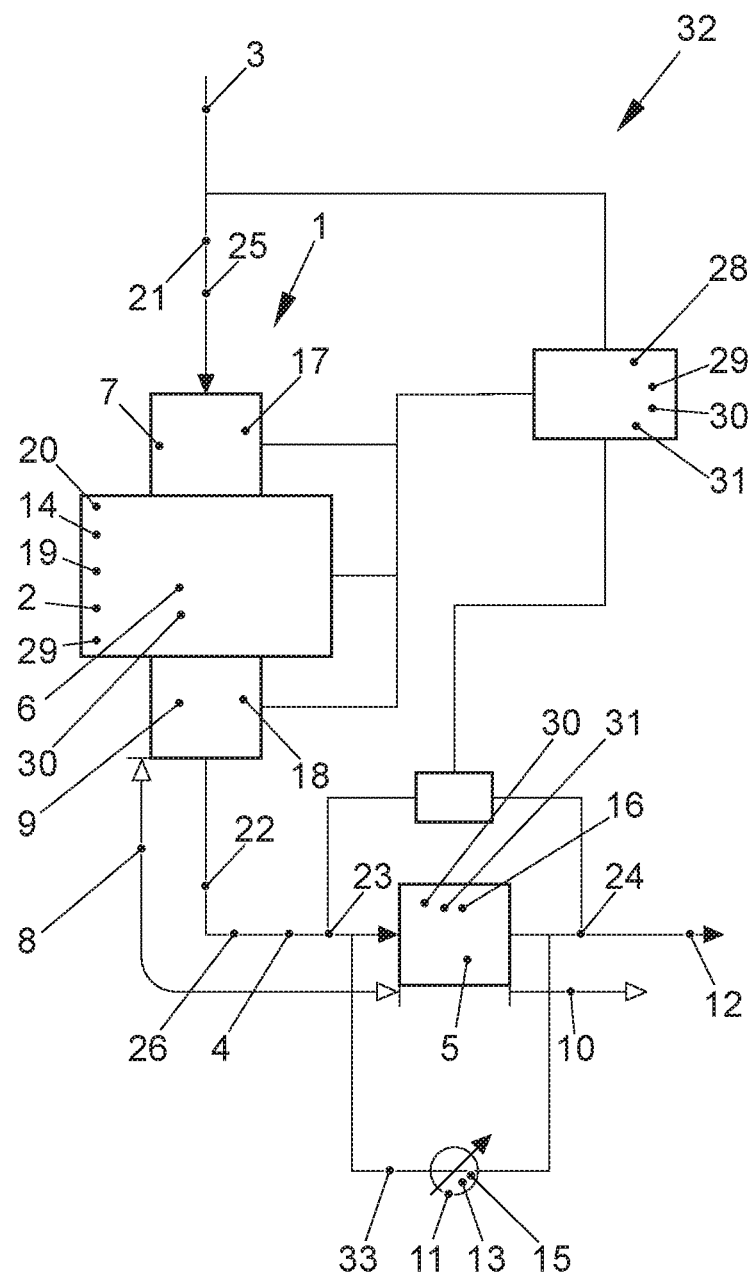
FIG. 5: shows a further motor vehicle having a drive train.

FIG. 5 shows a further motor vehicle 2 having a drive train 1. Reference is made to the discussion for FIG. 1. In the present case, the drive train 2 comprises a bypass 33 which bypasses the exhaust gas turbocharger 5 and which controllably connects the first section 8 to the second section 10.

The bypass 33 (or the flow cross section of the bypass 33 and/or the overall cross-sectional area of the bypass 33 and the exhaust gas turbocharger 5) is adjustable between a first position 11 having a smallest flow cross section for an exhaust gas 12, and a second position 13 having a largest flow cross section for the exhaust gas 12 (for example, continuously or in specific steps).

LIST OF REFERENCE NUMERALS 1 internal combustion engine
2 drive train
3 intake line
4 exhaust gas line
5 exhaust gas turbocharger
6 combustion chamber
7 intake valve
8 first section
9 exhaust valve
10 second section
11 first position
12 exhaust gas
13 second position
14 load requirement
15 position
16 turbine power
17 opening point in time
18 closing point in time
19 cylinder air mass
20 speed
21 air mass flow
22 exhaust gas mass flow
23 first pressure (exhaust gas back pressure)
24 second pressure (downstream from the turbine)
25 third pressure
26 temperature
27 profile
28 control unit
29 first model (cylinder air charge)
30 second model (exhaust gas mass flow)
31 third model (turbine power)
32 motor vehicle
33 bypass

The invention claimed is:

1. A method for charge pressure control of an internal combustion engine that is an integral part of a drive train,
   wherein the drive train comprises at least the internal combustion engine, an intake line, an exhaust gas line and an exhaust gas turbocharger;
   wherein the internal combustion engine has at least one intake valve that fluidically connects the intake line to a combustion chamber of the internal combustion engine, and has at least one exhaust valve that fluidically connects the combustion chamber to a first section of the exhaust gas line;
   wherein the first section is located between the combustion chamber and the exhaust gas turbocharger, and the exhaust gas line has a second section downstream from the exhaust gas turbocharger;
   wherein an overall cross-sectional area between the first section and the second section through which an exhaust gas may flow is adjustable via an adjustable bypass and/or the exhaust gas turbocharger, wherein:
   the adjustable bypass has a first position having a smallest flow cross section for the exhaust gas and a second position having a largest flow cross section for the exhaust gas, and/or
   the exhaust gas turbocharger is an adjustable exhaust gas turbocharger having a first position having a smallest flow cross section for the exhaust gas and a second position having a largest flow cross section for the exhaust gas;
   the method comprising:
   a) detecting a load requirement for the drive train; and
   b) iteratively determining a position of the exhaust gas turbocharger and/or of the bypass for providing turbine power of the exhaust gas turbocharger, taking into account an opening point in time of the at least one intake valve and a closing point in time of the at least one exhaust valve,
   wherein step b) further comprises determining a profile of the turbine power, at least as a function of a first pressure in the first section, and, based on the determined profile of the turbine power, iteratively determining a specific first pressure for which the turbine power is at a maximum.

2. The method according to claim 1, wherein during operation of the internal combustion engine, a time overlap of the opening point in time and of the closing point in time occurs, so that the first section is fluidically connected, at least temporarily, to the intake line via the combustion chamber.

3. The method according to claim 1, wherein at least one of the following parameters is additionally taken into account in step b): a cylinder air mass, a speed of the internal combustion engine, an air mass flow, an exhaust gas mass flow, a first pressure in the first section, a second pressure in the second section, a third pressure in the intake line, and a temperature of the exhaust gas.

4. The method according to claim 1, wherein, starting from the first position, the profile of the turbine power is iteratively determined in a stepwise manner toward the second position.

5. The method according to claim 1, wherein an increment of the iteration of step B is selected as a function of an available computing power of a control unit.

6. The method according to claim 5, wherein the increment is varied during the method.

7. The method according to claim 1, wherein the method is carried out only when a sudden change in load is present.

8. A motor vehicle comprising:
   a drive train that comprises at least an internal combustion engine, an intake line, an exhaust gas line and an exhaust gas turbocharger, wherein:
   the internal combustion engine has at least one intake valve that fluidically connects the intake line to at least one combustion chamber of the internal combustion engine and has at least one exhaust valve that fluidically connects the combustion chamber to a first section of the exhaust gas line,
   the first section is located between the combustion chamber and the exhaust gas turbocharger, and
   the exhaust gas line has a second section downstream from the exhaust gas turbocharger,
   an adjustable bypass of the exhaust gas turbocharger, wherein an overall cross-sectional area between the first section and the second section through which an exhaust gas may flow is adjustable via the adjustable bypass and/or the exhaust gas turbocharger, wherein:
   the adjustable bypass has a first position having a smallest flow cross section for the exhaust gas and a second position having a largest flow cross section for the exhaust gas, and/or the exhaust gas turbocharger is an adjustable exhaust gas turbocharger having a first position having a smallest flow cross section for the exhaust gas and a second position having a largest flow cross section for the exhaust gas, and at least one control unit configured to perform the following steps:
  a) detecting a load requirement for the drive train; and
  b) iteratively determining a position of the exhaust gas turbocharger and/or of the bypass for providing turbine power of the exhaust gas turbocharger, wherein the at least one control unit is configured to take into account an opening point in time of the at least one intake valve and a closing point in time of the at least one exhaust valve,
  wherein step b) further comprises determining a profile of the turbine power, at least as a function of a first pressure in the first section, and, based on the determined profile of the turbine power, iteratively determining a specific first pressure for which the turbine power is at a maximum.

9. A method for charge pressure control of an internal combustion engine that is an integral part of a drive train,
  wherein the drive train comprises at least the internal combustion engine, an intake line, an exhaust gas line and an exhaust gas turbocharger;
  wherein the internal combustion engine has at least one intake valve that fluidically connects the intake line to a combustion chamber of the internal combustion engine, and has at least one exhaust valve that fluidically connects the combustion chamber to a first section of the exhaust gas line;
  wherein the first section is located between the combustion chamber and the exhaust gas turbocharger, and the exhaust gas line has a second section downstream from the exhaust gas turbocharger;
  wherein an overall cross-sectional area between the first section and the second section through which an exhaust gas may flow is adjustable via an adjustable bypass and/or the exhaust gas turbocharger, wherein:
    the adjustable bypass has a first position having a smallest flow cross section for the exhaust gas and a second position having a largest flow cross section for the exhaust gas, and/or
    the exhaust gas turbocharger is an adjustable exhaust gas turbocharger having a first position having a smallest flow cross section for the exhaust gas and a second position having a largest flow cross section for the exhaust gas;
  the method comprising:
  a) detecting a load requirement for the drive train; and
  b) determining a position of the exhaust gas turbocharger and/or of the bypass for providing maximum turbine power of the exhaust gas turbocharger based on:
    a plurality of first pressure values measured over a first period of time in the first section, and
    opening times of the at least one intake valve and closing times of the at least one exhaust valve during the first period.

10. The method according to claim 9, wherein during operation of the internal combustion engine, a time overlap of the opening times and of the closing times occurs, so that the first section is fluidically connected, at least temporarily, to the intake line via the combustion chamber.

11. The method according to claim 9, wherein at least one of the following parameters is additionally taken into account in step b): a cylinder air mass, a speed of the internal combustion engine, an air mass flow, an exhaust gas mass flow, a first pressure in the first section, a second pressure in the second section, a third pressure in the intake line, and a temperature of the exhaust gas.

12. The method according to claim 9, wherein, starting from the first position, a profile of the turbine power is iteratively determined in a stepwise manner toward the second position.

13. The method according to claim 9, wherein an increment of the iteration is selected as a function of an available computing power of a control unit.

14. The method according to claim 13, wherein the increment is varied during the method.

15. The method according to claim 9, wherein the method is carried out only when a sudden change in load is present.

* * * * *